(12) United States Patent
Birka et al.

(10) Patent No.: US 7,865,515 B2
(45) Date of Patent: Jan. 4, 2011

(54) SERVER SIDE BUCKETIZATION OF PARAMETERIZED QUERIES

(75) Inventors: Adrian Birka, Redmond, WA (US); Ganapathy Subramaniam Krishnamoorthy, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 201 days.

(21) Appl. No.: 11/467,802

(22) Filed: Aug. 28, 2006

(65) Prior Publication Data

US 2008/0065589 A1 Mar. 13, 2008

(51) Int. Cl.
G06F 7/00 (2006.01)
(52) U.S. Cl. .................. 707/759; 707/791; 707/802
(58) Field of Classification Search .................. None
See application file for complete search history.

(56) References Cited

U.S. PATENT DOCUMENTS

| | | | | |
|---|---|---|---|---|
| 5,590,324 A * | 12/1996 | Leung et al. | ..................... | 707/5 |
| 5,822,747 A * | 10/1998 | Graefe et al. | .................... | 707/2 |
| 5,893,104 A * | 4/1999 | Srinivasan et al. | ........... | 707/102 |
| 6,006,214 A * | 12/1999 | Carey et al. | ..................... | 707/2 |
| 6,115,705 A * | 9/2000 | Larson | ........................... | 707/3 |
| 6,356,887 B1 * | 3/2002 | Berenson et al. | ................ | 707/2 |
| 6,601,058 B2 * | 7/2003 | Forster et al. | ................... | 707/3 |
| 7,254,575 B1 * | 8/2007 | Li et al. | ........................... | 707/3 |
| 7,310,638 B1 * | 12/2007 | Blair | .............................. | 707/4 |
| 7,395,270 B2 * | 7/2008 | Lim et al. | .................... | 707/101 |
| 7,505,985 B2 * | 3/2009 | Kilroy | ........................ | 707/101 |
| 2003/0154191 A1 * | 8/2003 | Fish et al. | ........................ | 707/2 |
| 2003/0225759 A1 * | 12/2003 | Nonko et al. | .................... | 707/4 |
| 2004/0143581 A1 * | 7/2004 | Bohannon et al. | ............ | 707/100 |
| 2005/0222980 A1 * | 10/2005 | Lee | ................................ | 707/3 |
| 2005/0234878 A1 * | 10/2005 | Dettinger et al. | ................ | 707/3 |
| 2006/0224563 A1 * | 10/2006 | Hanson et al. | .................. | 707/2 |
| 2008/0033960 A1 * | 2/2008 | Banks et al. | .................... | 707/9 |
| 2008/0033967 A1 * | 2/2008 | Murthy | ........................ | 707/100 |

FOREIGN PATENT DOCUMENTS

GB 2227339 A * 7/1990

OTHER PUBLICATIONS

Du_Mouza et al., Efficient Evaluation of Parameterized Pattern Queries, Oct. 2005, ACM, pp. 728-735.*

(Continued)

Primary Examiner—Srirama Channavajjala
Assistant Examiner—Jessica N Le
(74) Attorney, Agent, or Firm—Turocy & Watson, LLP

(57) ABSTRACT

Efficient server-side query statement parameter bucketization is provided for a query language, such as the structured query language (SQL). A process is applied for replacing the parameters of a parameterized query with new parameters, whose types are normalized to enable more query execution plan sharing. In one embodiment, in response to receiving a parameterized query expression of a query language, the bucketization process operates to bucketize parameter(s) of the parameterized expression based on the type(s) of the parameter(s) by replacing the type(s) with new broader, or more specific, type(s). An existing server-side parameterization framework that includes a mechanism for determining when parameterization is "safe," is extended, and is applied to bucketize parameters by using the mechanism to determine when replacing a parameter(s) of parameterized expressions with new parameter(s) of different type(s) is safe.

13 Claims, 15 Drawing Sheets

OTHER PUBLICATIONS

Cohen et al., Automatic High-Quality Reengineering of Database Programs by Abstraction, Transformation and Reimplementation, Jul. 2003, vol. 12, Issue 3, pp. 285-316.*

Sanjay Kaluskar, et al., "Boost SQL Performance with cursor_sharing". Oracle Corporation, Jul. 2001. http://www.oracle.com/technology/tech/oci/pdf/cursor_sharing.pdf.

* cited by examiner

| Original Parameter Type 310 | New Parameter Type 320 |
|---|---|
| varchar(n) for 1 <= n <= 8000 | varchar(8000) |
| nvarchar(n) for 1 <= n <= 4000 | nvarchar(4000) |
| varbinary(n) for 1 <= n <= 8000 | varbinary(8000) |
| numeric(a,b) | numeric(38,b) |
| any other type T | T |

Table 300

(@p1 varchar(10))select * from customers where state = @p1

(@p1 varchar(6))select * from customers where state = @p1

FIG. 9B

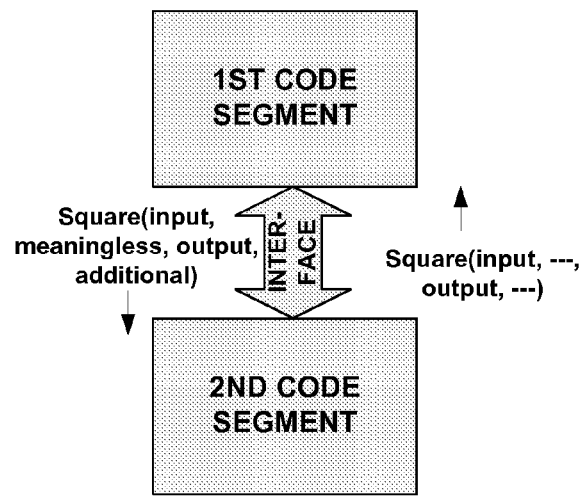
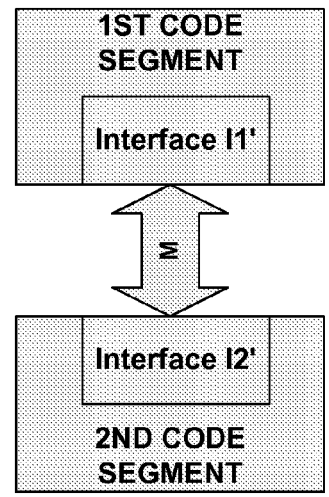
FIG. 14A  FIG. 14B
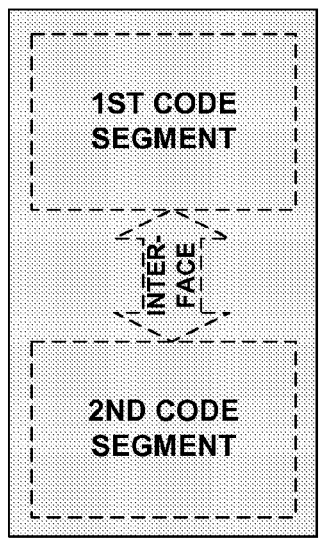
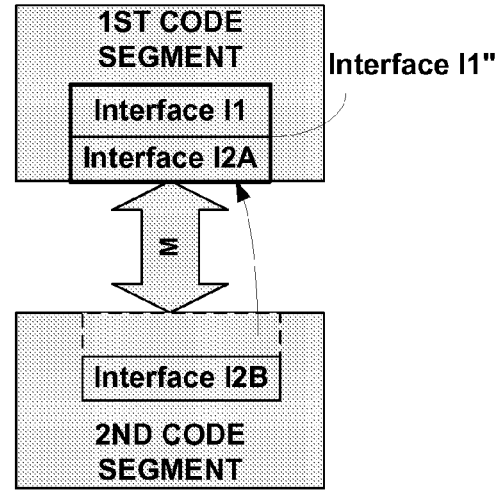
FIG. 15A  FIG. 15B

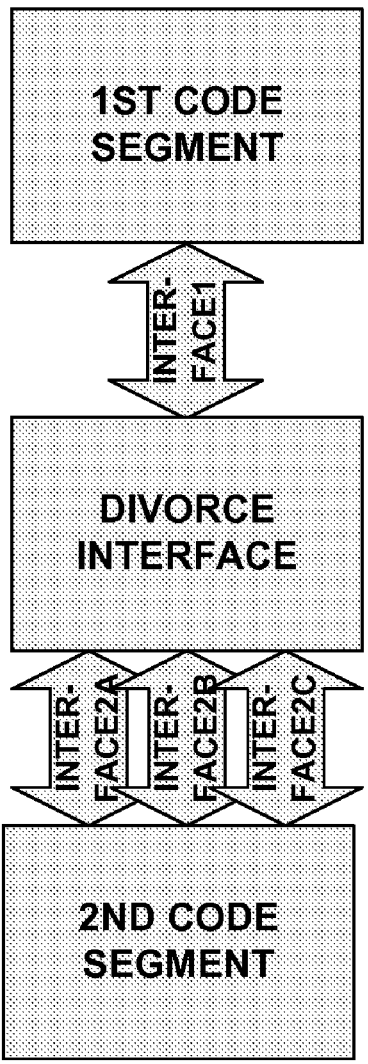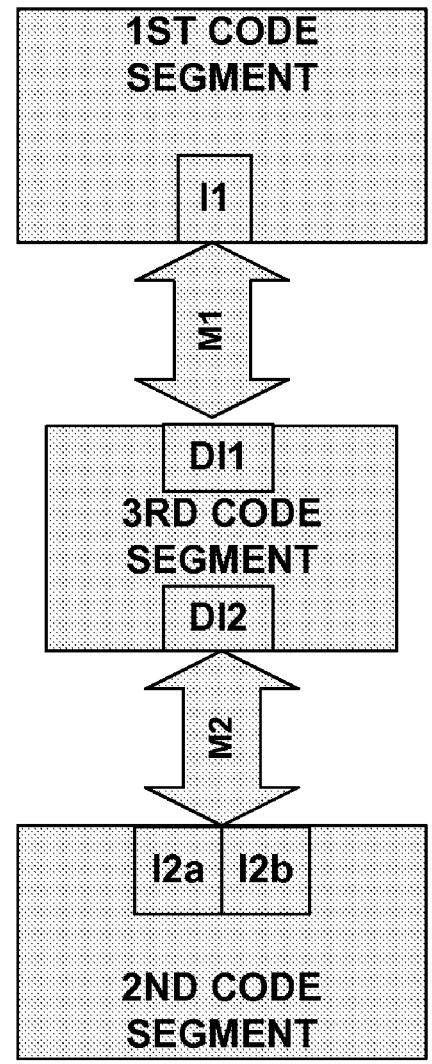
FIG. 16A
FIG. 16B

SERVER SIDE BUCKETIZATION OF PARAMETERIZED QUERIES

TECHNICAL FIELD

The present invention relates generally to the field of relational database management systems (DBMS). More particularly, the invention relates to a server side technique for bucketizing parameterized queries submitted to a relational data store.

BACKGROUND

Oftentimes, an application or service that queries a data store via one or more queries for requesting data will repeat the same or similar query many different times. For instance, during a data gathering step, an application might use the structured query language (SQL), which is a query language used to query relational databases, to repeatedly query a relational data store in the same or a similar manner. In this regard, applications sending SQL statements to a database management system (DBMS), such as SQL Server, often submit many statements, which are identical to one another except for a small modification, such as to the literal constants appearing in the statement.

For example, SQL statement 800 and 810 of FIGS. 8A and 8B, respectively satisfy this condition. Query 800 selects 802 from a database table 804 named 'customers' all of the entries according to expression 806, i.e., wherever the state is named 'California' in table 804 and likewise query 810 selects 812 from the database table 804 all of the entries where the state is named 'Georgia' according to expression 816.

A query plan, or query execution plan, is a set of steps used to access information in a SQL relational DBMS. Since SQL is declarative, there are typically a large number of alternative ways to execute a given query, with widely varying performance. In this regard, today, when a query is submitted to the database, a query optimizer on the server side typically evaluates some of the different, correct possible plans for executing the query and returns what the optimizer considers the best alternative. Then, the query is executed according to the optimized query plan, and the results are returned via an efficient execution path.

For uniform data distributions, two statements that differ only in literals will often share the same query execution plan determined by the query optimizer. Because execution plans can be expensive to compile, both in terms of central processing unit (CPU) time and memory use, execution plan sharing among such similar-looking statements can give significant performance benefits to a relational database system, such as a SQL DBMS.

To allow this performance benefit, SQL client drivers, e.g., Object Linking & Embedded Database (OLEDB), ActiveX Data Object.NET (ADO.NET), etc., currently permit applications to specify that the query should be parameterized. For example, the application developer writes a single query 820 instead of queries 800 and 810 of FIGS. 8A and 8B above including select command 822, which selects from customers table 804 according to the parameterized expression 826. Parameterized expression 826 is said to be parameterized because the particular state names are replaced with a '?' placeholder 828. In practice today, an application then merely supplies the values for the '?' placeholder 828 each time the application needs to execute the query with particular values.

For instance, using the example queries 800 and 810 of FIGS. 8A and 8B, to execute query 800, the application may tell the client driver to execute the parameterized statement 820 of FIG. 8C with 'California' as the value for a '?' placeholder 828; similarly, to execute query 810, the application may tell the client driver to execute the parameterized statement 820 of FIG. 8C with 'Georgia' as the value for the '?' placeholder 828.

When the client drivers and interfaces receive a statement with a '?' placeholder 828 from an application, a parameterized query is generated by the client drivers and then sent to the SQL DBMS server. At this point, the client drivers do not require the application to specify parameter types for the placeholders, and many applications do not. In those cases, however, the client drivers need to deduce the type of the placeholder in order to generate the parameterized query. Unfortunately, many client drivers perform this deduction poorly. Specifically, the client drivers use the actual values passed for '?' placeholders to deduce the parameter type to send to the SQL DBMS. For example, if parameterized query 820 is invoked with 'California' as the value for '?' 828, the client driver would generate statement 900 of FIG. 9A, while if 'Georgia' is used as value for '?' 828, the client driver would generate statement 910 of FIG. 9B. While statements 900 and 910 appear similar, statements 900 and 910 are different queries from the point of view of a SQL DBMS, because the types of @p1 are different. Specifically, the type 902 of @p1 in the example of statement 900 is varchar(10) referring to a varchar of length 10, and the type 912 of @p1 in the example of statement 910 is varchar(6) referring to a varchar of length 6. Thus, even though the application specified the same query 820 of FIG. 8C, two different queries are nonetheless sent to the server.

Each query is then optimized by a query optimizer, which is costly both in CPU time and memory consumption, and the resulting plan is stored in the execution plan cache, taking up valuable memory space. It would be considerably more desirable, therefore, if it were possible to share query execution plans for statements, such as statements 900 and 910, when parameterized. One might consider that considerably more complex examples are possible than the exemplary queries of FIGS. 8A and 8B, and one can imagine data processing applications that would implicate thousands, millions, even billions of the same or similar queries. Sharing execution plans in such cases would be extremely advantageous to avoid much unnecessary processing time and memory.

While it is possible to provide a smarter way of deducing parameter types by the client drivers on the client side, the above-described deficiency of the state of the art of parameterizing queries affects a wide range of drivers, not just a single set. Thus, such a solution would require updating a lot of widely distributed client side software for each set of separate drivers, which is not very practical. Even if such client side software could be re-written or updated for the wide range of drivers that exist, there may still nonetheless be customers who fail to obtain and install the updated versions. Accordingly, customers using old versions of client drivers would still observe the above-described performance problems from lack of efficient sharing of query execution plans. Hence, a solution on the server-side that interacts with the existing range of client drivers is desirable.

Other deficiencies in the state of the art of query optimization for parameterized queries in a computing system will also become apparent upon review of the following description of various exemplary, non-limiting embodiments of the invention.

SUMMARY

In consideration of the foregoing needs in the art of query processing, techniques for performing efficient server-side query statement parameter bucketization is provided for a query language, such as the structured query language (SQL). The server-side parameter bucketization applies a process for replacing the parameters of a parameterized query supplied by the client with new parameters, whose types are normalized to enable more query execution plan sharing.

In an exemplary, non-limiting embodiment of the invention, in response to receiving a parameterized query expression of a query language, a bucketization process operates to bucketize parameter(s) of a parameterized expression of a query language based on the type(s) of the parameter(s) by replacing the type(s) with new type(s) according to a conversion algorithm, e.g., as represented by a type conversion table. In another aspect of the invention, an existing server-side parameterization framework that includes a mechanism for determining when parameterization is "safe," is extended, and can be applied to bucketize parameters in accordance with the invention by using the mechanism to determine when replacing a parameter(s) of parameterized expressions with new parameter(s) of different type(s) is safe.

A simplified summary is provided herein to help enable a basic or general understanding of various aspects of exemplary, non-limiting embodiments that follow in the more detailed description and the accompanying drawings. This summary is not intended, however, as an extensive or exhaustive overview of the subject matter of the invention. The sole purpose of this summary is to present some concepts related to the various exemplary non-limiting embodiments of the invention in a simplified form as a prelude to a more complete description of those concepts and various other features of the present invention described below.

BRIEF DESCRIPTION OF THE DRAWINGS

The system and methods for processing parameterized queries in accordance with the invention are further described with reference to the accompanying drawings in which:

FIG. 3 represents an exemplary, non-limiting implementation of a set of type conversions applied to broaden parameter types of parameterized queries processed by server side software in accordance with the invention;

FIGS. 9A and 9B provide further illustrative examples of SQL pseudo-code that show use of the parameter type bucketization processes in accordance with the invention;

FIGS. 12A to 17B illustrate exemplary ways in which similar interface code can be provided to achieve similar or equivalent objective(s) of any interface(s) provided on a client or server side in accordance with the invention.

DETAILED DESCRIPTION

As mentioned in the background, current techniques for designating parameterized queries in a query language, such as SQL, are inadequate because when an application fails to specify the type of a parameter placeholder in a parameterized query, client drivers end up deducing the type of the parameter placeholder based on a guess premised on the actual literals passed by an application for the parameter placeholder. The actual literals passed, however, may vary widely within the range of values that may apply to the parameterized query resulting in additional optimization costs due to having to optimize again each time the actual literals passed with the parameter placeholder change. It was also discussed that a client side solution is generally unmanageable as a solution.

Accordingly, in consideration of the state of the art, the invention provides an efficient server side solution that, when activated, bucketizes types for parameterized queries in an optimal manner as the parameterized queries are received by the database server from client side drivers, avoiding the costs due to repeated optimizations based on varying actual literals. Where results are not changed due to the type transformation, the type of the parameter is broadened (or narrowed, if desirable). As a result of broadening the type of the parameter, i.e., bucketizing the parameter, optimization costs due to actual literal changes are avoided because each of the actual literals can be typed as the broadened type.

The invention thus provides server-side parameter bucketization, wherein a parameterized query sent by a client is received by a server, which applies a process for replacing the parameters supplied by the client with new parameters, whose types are normalized to allow more query execution plan sharing. Referring back to the example discussed in the background in connection with statements 900 and 910 of FIGS. 9A and 9B, respectively, statements 900 and 910, when processed according to the invention by the server, are both converted by parameter bucketization to statement 100 of FIG. 1, which transforms types 902 and 912 of FIGS. 9A and 9B, respectively, to a parameter @0 101 of bucket type 103, which is a broad enough bucket to encompass both types: varchar(10) and varchar(6).

Figure 8A:
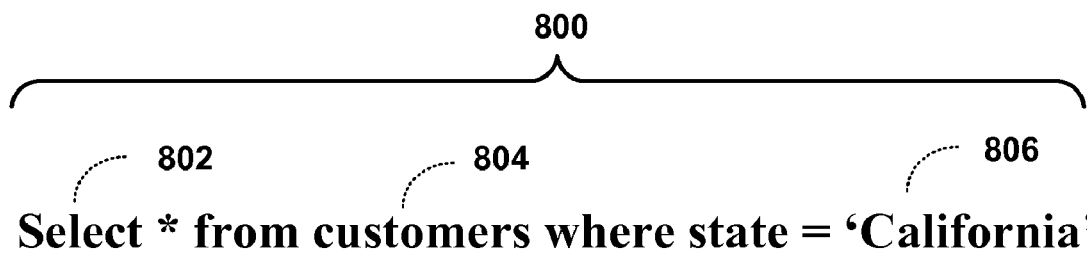
FIGS. 8A, 8B and 8C provide illustrative examples of SQL pseudo-code that show the benefits of the operation of the parameter type bucketization processes in accordance with the invention.
Figure 8B:
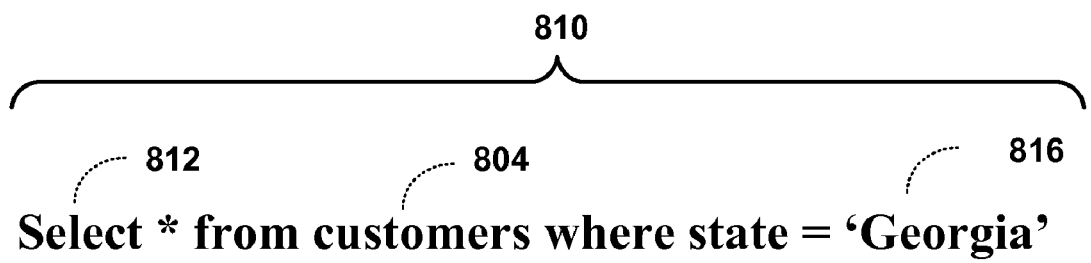
Figure 8C:
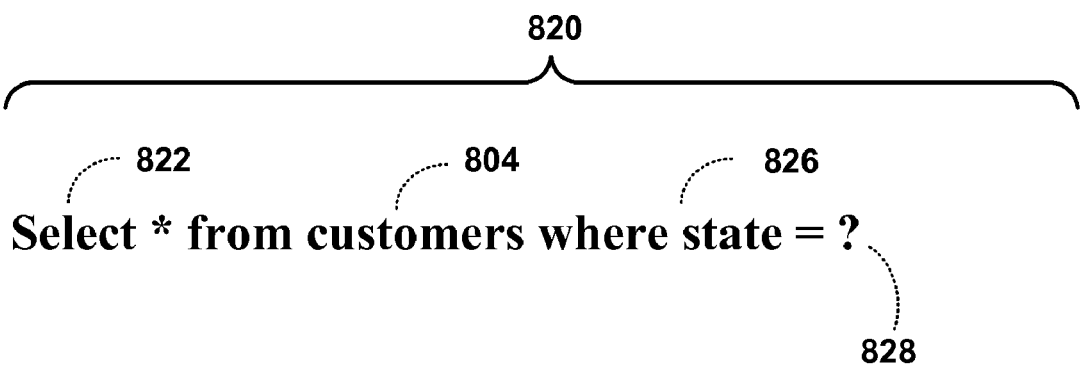

Thus, both invocations of the parameterized query 820 of FIG. 8C by an application will execute the same query 100 in accordance with the invention, thereby efficiently enabling sharing of query execution plans for the similar queries, whereas in the past, as described in the background, separate queries were executed even though the query 820 was parameterized.

Figure 1:
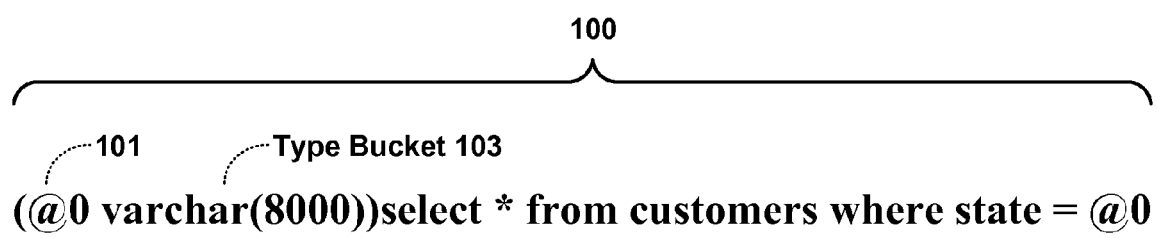
FIG. 1 illustrates an exemplary, non-limiting query statement generated according to parameter bucketization processes in accordance with the invention.

The present invention also recognizes that parameter bucketization, e.g. bucketizing type varchar(10) 902 and type varchar(6) 912 of FIGS. 9A and 9B, respectively, into the same varchar(8000) bucket type 103 as illustrated in FIG. 1, if not done right, can change the semantics of a SQL statement. In other words, different data and/or metadata may be returned by the server to a client when comparing the results of an original (unbucketized) query and the results of a query resulting from the bucketization process of the invention. Therefore, bucketization decisions made in accordance with the invention are carefully considered by a DBMS server to ensure bucketization does not change any underlying semantics of a SQL statement.

There is an existing feature of SQL Server, referred to as "server-side parameterization," that performs parameterization for queries with literals in them on the server side, by replacing the literals with parameters. This feature has a framework for determining when parameterization is "safe" to do, i.e., when replacing the literal with a parameter will not change data or metadata sent back to the client. Accordingly, in other exemplary, non-limiting embodiments of the invention, the same or a similar framework is extended, and used for parameter bucketization to determine when replacing a parameter with a new parameter of a different, broader type is "safe" to do in terms of unwanted changes to the underlying semantics of the SQL statement to which the bucketization is to be applied. Accordingly, one aspect of the invention includes extending the server-side parameterization feature to help bucketize parameters in accordance with the invention.

Using the server-side parameterization feature is thus one way to determine the safety of parameter type transformation when bucketizing in accordance with the invention in a system that supports SQL queries; however, for the avoidance of doubt, the invention can utilize other ways as known and described herein, and their equivalents, for performing bucketization of parameters, and the invention can applied to any storage system to bucketize query parameters, not just SQL relational systems.

This is yet another reason why a client-side solution to the parameter bucketization problem described above in the background is not feasible. Simply put, client drivers have no good way of determining when bucketization is semantically safe because they cannot perform the semantic analysis of a query in the way that the parameterization infrastructure of SQL Server is already capable. Accordingly, the server-side parameterization framework is extended in accordance with the invention, and the extensions can be applied to bucketize parameters in accordance with the invention by using the mechanism of the server-side parameterization framework that determines when replacing a parameter(s) of parameterized expressions with new parameter(s) of different type(s) is safe.

Figure 2:
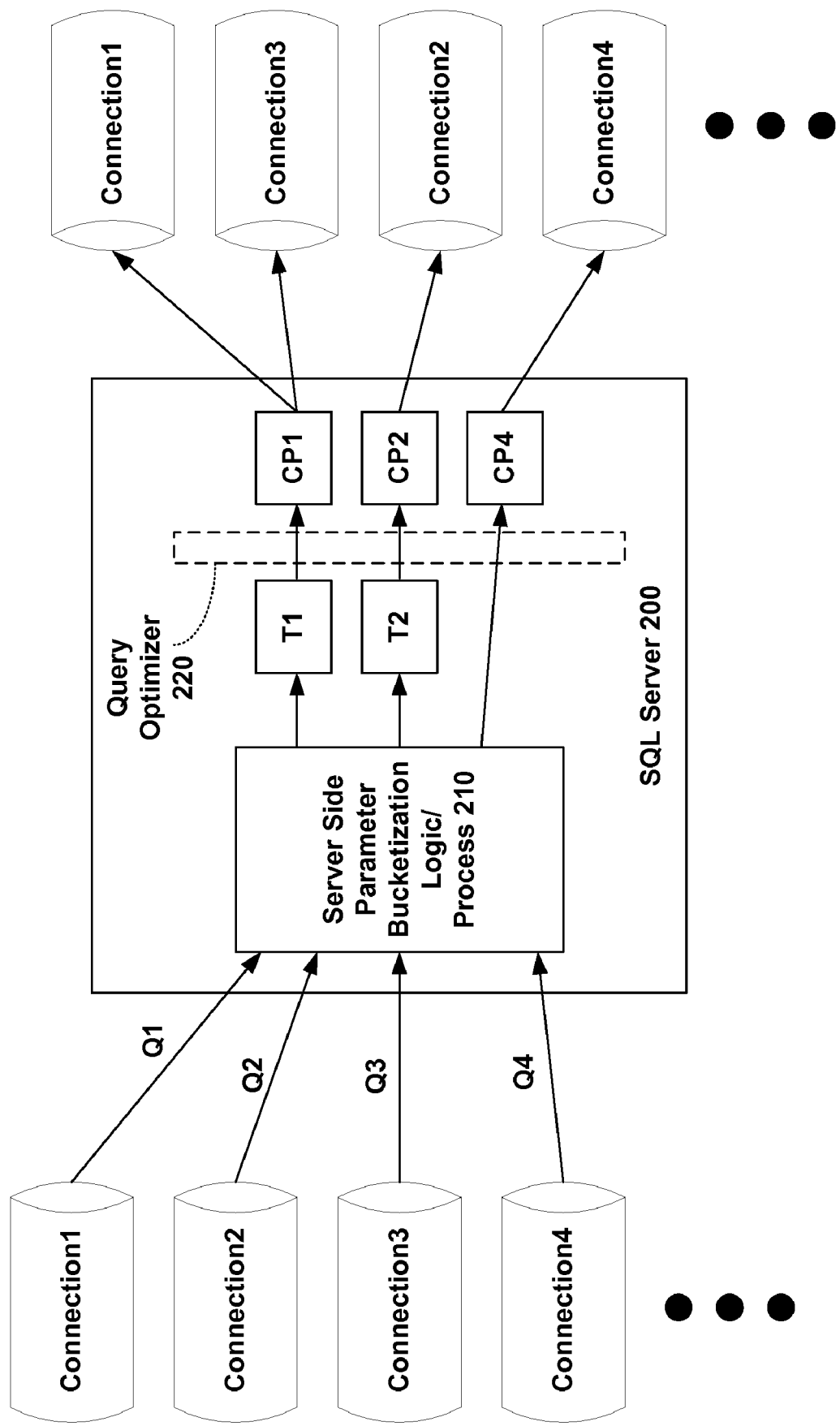
FIG. 2 is an exemplary, non-limiting block diagram illustrating the processing of parameterized queries in accordance with bucketization processes of the invention.

FIG. 2 is a schematic diagram showing four connections Connection1, Connection2, Connection3 and Connection4 active on a SQL Server 200. For the avoidance of doubt, while exemplary, non-limiting embodiments of the invention are described herein in the context of a SQL Server for convenience and concreteness, the ideas and concepts described are considered applicable to any DBMS in accordance with the invention. In FIG. 2, connections Connection1, Connection2, Connection3 and Connection4 are connections created by various client machines including client drivers for submitting parameterized queries. In the example, connections Connection1, Connection2, Connection3 and Connection4 are submitting four queries Q1, Q2, Q3 and Q4, respectively. As an example, suppose that each of the submitted queries Q1, Q2, Q3 and Q4 is a parameterized query, e.g., generated by a client driver from a query with '?' placeholders 828 submitted by an application. It is also possible to generate a parameterized query, such as parameterized query 820 of FIG. 8C, by explicitly submitting a parameterized query to the server by a user.

As further illustrated in FIG. 2, a software component 210 of SQL Server 200, denoted by "Server-side parameter bucketization logic/process," is provided in accordance with the invention. If component 210 is activated (i.e., the bucketization processes of the invention are optional), parameters of incoming queries are replaced with new generated parameters whose names are standardized, e.g., as @0, @1, @2, @3, etc., as in the illustrative examples herein.

For instance, an exemplary non-limiting table for bucketizing parameterized queries in accordance with the invention is shown as table 300 of FIG. 3. Table 300 illustrates an exemplary bucketization type transformation process in accordance with the invention wherein parameter types 310 received by bucketization logic 210 are bucketized to parameter types 320. For instance, if an original parameter type received from the client drivers is a varchar(n) for any length n between 1 and 8000 characters, the new parameter type applied becomes varchar(8000) as part of a new query generated by bucketization logic 210. For the avoidance of doubt, the numerical maximums of 4000, 8000, etc. are to be considered exemplary non-limiting design choices, and it can be appreciated that other maximums or minimums may make more sense under some circumstances. Thus, table 300 is not to be considered an essential way to practice the invention, but rather an illustrative example of merely one way to bucketize parameter types 310 of parameterized queries to new parameter types 320 in accordance with the invention in a way that improves sharing of query execution plans.

Returning to the example of FIG. 2, the parameter bucketization logic 210 inspects each parameter in the queries Q1 through Q4 to determine whether it is safe to change the type of the parameter, i.e., to determine whether the underlying semantics of the query statements remain unchanged so that the same query results are obtained with or without bucketization. As mentioned, depending on the context in which the parameter appears in the query, it is possible that changing its type will change the metadata returned by the query; consequently, parameter bucketization logic 210 advantageously performs an evaluation of whether there will be any semantic change in expression, and if so, leaves those parameters' types unchanged.

In one non-limiting embodiment, an infrastructure employed by server-side parameterization processes of SQL Server is used to determine whether a given parameter is a safe candidate for replacement, i.e., bucketization, in accordance with the invention. The bucketization logic 210 then constructs new queries where replacement occurs (e.g., T1 and T2 in FIG. 2), and the transformed queries T1 and T2 are passed to a query optimizer component 220 instead of the original incoming queries.

Figure 4:
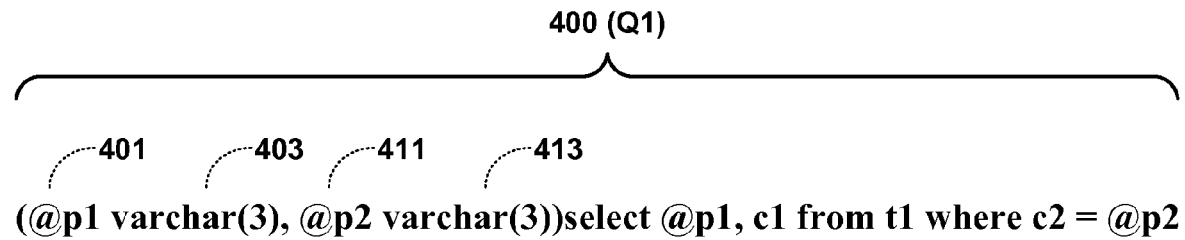
FIGS. 4 and 5 illustrate exemplary, non-limiting transformation of a parameterized query Q1 to a query T1 with bucketized parameters in accordance with the invention.
Figure 5:
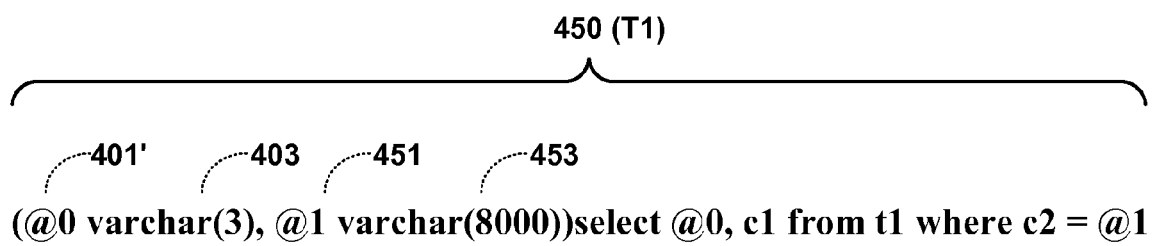

For example, if Q1 of FIG. 2 is the exemplary query statement 400 shown in FIG. 4, then the type bucketization logic 210 of the invention operates to transform query statement 400 for Q1 to query statement 450 for T1 as shown in FIG. 5. More specifically, as shown in the example, the portion 401 of statement 400 indicates a parameter type @p1, which indicates that statement 400 is a parameterized query statement arriving from the client drivers via connection1.

As related above, client drivers may attempt to deduce a type for the parameter based on an actual value passed for the parameter, e.g., if the value passed is "USA" for a parameterized country code of a parameterized query, the client side drivers may type the parameter as type 403, namely varchar (3), which as discussed in the background, may lead to inefficient query execution plans despite the purported benefit of a parameterized query 400. Similarly, such client drivers may attempt to deduce a type for the parameter 411, i.e., @p2 according to the naming convention shown, based on an actual value passed for the parameter, e.g., if the value passed is "Jim" for a parameterized name code of a parameterized query, the client side drivers may type the parameter as type 413, i.e., varchar(3). Accordingly, parameterized query 400 for Q1 is generated, or explicitly submitted, by the client drivers.

As mentioned, statement 450 for T1 is shown as the result of transforming the query statement 400 according to bucketization processes of the invention. As shown, the first parameter's type 403 is not changed, because statement 400 is evaluated to determine whether any semantic change would occur that would cause different metadata to be returned by the query, though in this example, the name 401 of the parameter is changed to name 401' (re-named as @0). In this case, such a semantic change would occur, and thus, the type 403 is left unchanged in statement 450.

In contrast, the second parameter's type 453 has changed according to the bucketization processes of the invention since it is determined that no semantic change results from bucketizing the parameter type. Thus, based on the exemplary table 300 of FIG. 3, parameter @p2 411 is re-named parameter @1 451 and parameter @1 451 is assigned bucket type 453, which in this example, is varchar(8000). The bucketization process is thus applied to each of the parameters of parameterized queries received by server 200, where applicable.

In one embodiment, if no parameter in the incoming query changes type by the bucketization process, then no new query is constructed, and the original query is passed to the optimizer directly.

Returning again to FIG. 2, a situation is illustrated wherein Q1 and Q3, after passing through the parameter bucketization component 210, generate the same query T1, and the optimizer 220 generates CP1 as execution plan for T1. Q2, after passing through bucketization component 210, generates a different query T2, and the optimizer 220 generates CP2 as plan for T2. Q4, in turn, has no parameters whose types would change by bucketization process 210, e.g., because every parameter either has non-string non-numeric type or appears in a context where changing its type is unsafe. Thus, Q4 is passed to the optimizer unchanged, and the optimizer generates CP4 as its plan. The results are then passed back to the respective requesting connections Connection1, Connection2, Connection3 and Connection4.

One can appreciate that even though Q1 and Q3 may share the same execution plan CP1 making for more efficient execution of both queries, queries Q1 and Q3 produce different, independent results. For instance, when execution plan CP1 is executed by connection1, the values submitted by the client for parameters of Q1 are used as values for the new parameters of T1 to produce the query results. Similar substitution of the values submitted with Q3 occurs with the new parameters of T3 in connection with connection3. Thus, it can be appreciated that the actual results returned to connection1 and connection3 are independent from one another based on the particular values submitted by an application.

FIG. 2 thus illustrates another benefit of the invention. Where Q1 is submitted and received by bucketization logic 210, transformed to T1 and processed by the query optimizer to form execution plan CP1 before Q3 is received by the server 200, then advantageously, Q3's query compilation costs are avoided by the invention. This is since CP1 has already been compiled and cached by connection1 beforehand, and thus is available for re-use when Q3 is transformed to T1 via the bucketization process as well.

Other benefits of the invention can be illustrated by comparing the operation of the invention to the case where server-side parameter bucketization is not applied. Where bucketization is not utilized, queries, such as Q1 and Q3, will each have separate execution plans cached for them, each having a separate query optimization cost. As mentioned in the background, client drivers generate different lengths and precisions for the parameters they submit, deriving these lengths and precisions from the actual length and precision of the data the application passes for that parameter. Hence, without the parameter bucketization processes of the invention, a statement that a client application parameterizes would have to be compiled every single time it is submitted to the server, causing undue CPU time costs and pollution of the execution plan cache. Thus, the invention improves overall performance by reducing computation through increased sharing of execution plans for parameterized queries, and also improves cache memory usage and overall performance by keeping separate execution plans for similar queries around in the cache memory.

Figure 6:
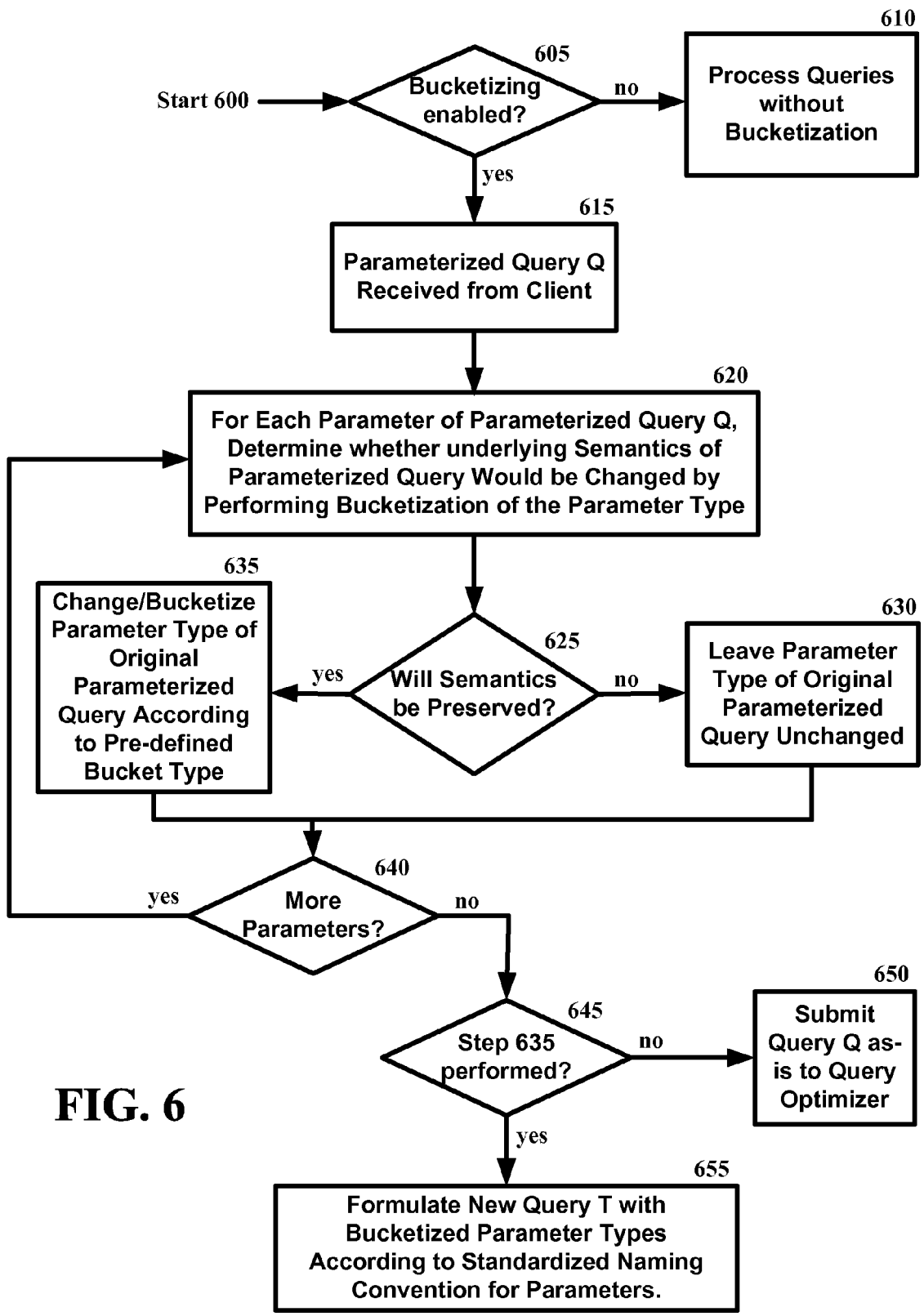
FIG. 6 illustrates an exemplary, non-limiting flow diagram of a bucketization process in accordance with the invention.

FIG. 6 illustrates an exemplary, non-limiting flow diagram of a bucketization process in accordance with the invention. As shown, after start 600, since bucketization is an optional optimization process, it is determined at 605 whether bucketizing is enabled. If not, queries are processed as usual at 610. If bucketizing is enabled, then, at 615, a parameterized query Q is received by the database server, e.g., from client drivers. Then, at 620, for each parameter of the parameterized query Q, it is determined whether the underlying semantics of the parameterized query would be changed by performing bucketizing of the parameter type (i.e., would the query results change). The decision is represented by 625. If semantics cannot be preserved by bucketizing, then the parameter type is left unchanged 630.

If, on the other hand, it is determined at 625 that no change in semantic information of the query Q will occur as a result of bucketizing, then the flow proceeds to 635 wherein the parameter type of the parameter of the parameterized query Q is changed to a new parameter type according to a pre-defined type conversion algorithm. This process repeats at 640 back to 620 until all of the parameters of the parameterized query Q are examined in this fashion, whereby the flow shifts to 645 wherein it is determined whether any parameter types have been modified (i.e., according to step 635). If no parameter types have been modified, the query Q is submitted to the optimizer as is at 650. If any parameter types have been modified, then the flow proceeds to 655 wherein a new bucketized query T is formulated according to a standardized naming convention for the new parameter(s) having the new type(s) assigned in step 635.

Figure 7:
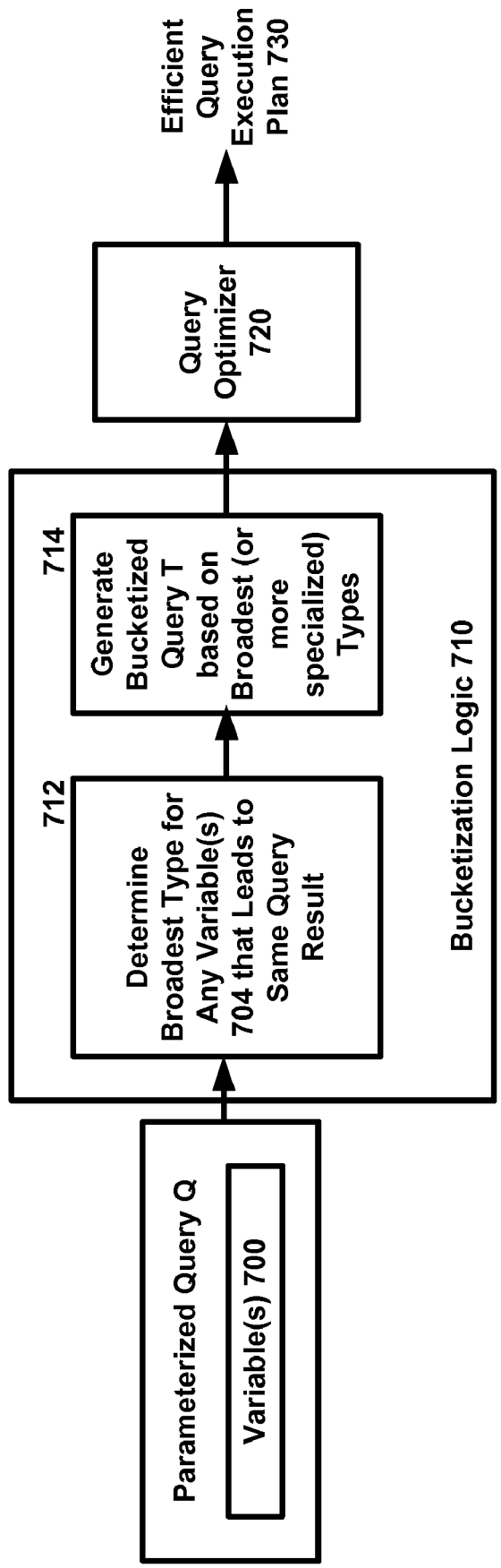
FIG. 7 is a block diagram illustrating the ability of the bucketization processes of the invention to transform parameters, or variables, in accordance with parameter type conversions of the invention.

FIG. 7 is a block diagram illustrating the ability of the bucketization processes of the invention to transform parameters, or variables, in accordance with parameter type conversions of the invention. As shown, a parameterized query Q, wherever originated or generated may include a list of variables 700. In one embodiment of the invention, bucketization logic 710 operates to determine with a subcomponent 712 the broadest (or more specialized) type for any variables 700 that leads to the same query results (no change in semantic information) and optimal use of query execution plans. Subcomponent 714 in turn operates to generate a bucketized query T based on the broadest (or more specialized) type determined by subcomponent 712. Query T is then submitted to optimizer 720, which then automatically produces an efficient query execution plan as a result of the operation of bucketization logic 710.

Exemplary Networked and Distributed Environments

One of ordinary skill in the art can appreciate that the invention can be implemented in connection with any computer or other client or server device, which can be deployed as part of a computer network, or in a distributed computing environment, connected to any kind of data store. In this regard, the present invention pertains to any computer system or environment having any number of memory or storage units, and any number of applications and processes occurring across any number of storage units or volumes, which may be used in connection with processing parameterized queries in accordance with the present invention. The present invention may apply to an environment with server computers and client computers deployed in a network environment or a distributed computing environment, having remote or local storage. The present invention may also be applied to standalone computing devices, having programming language functionality, interpretation and execution capabilities for generating, receiving and transmitting information in connection with remote or local services and processes.

Distributed computing provides sharing of computer resources and services by exchange between computing devices and systems. These resources and services include the exchange of information, cache storage and disk storage for objects, such as files. Distributed computing takes advantage of network connectivity, allowing clients to leverage their collective power to benefit the entire enterprise. In this regard, a variety of devices may have applications, objects or resources that may implicate the systems and methods for processing parameterized queries of the invention.

Figure 10:
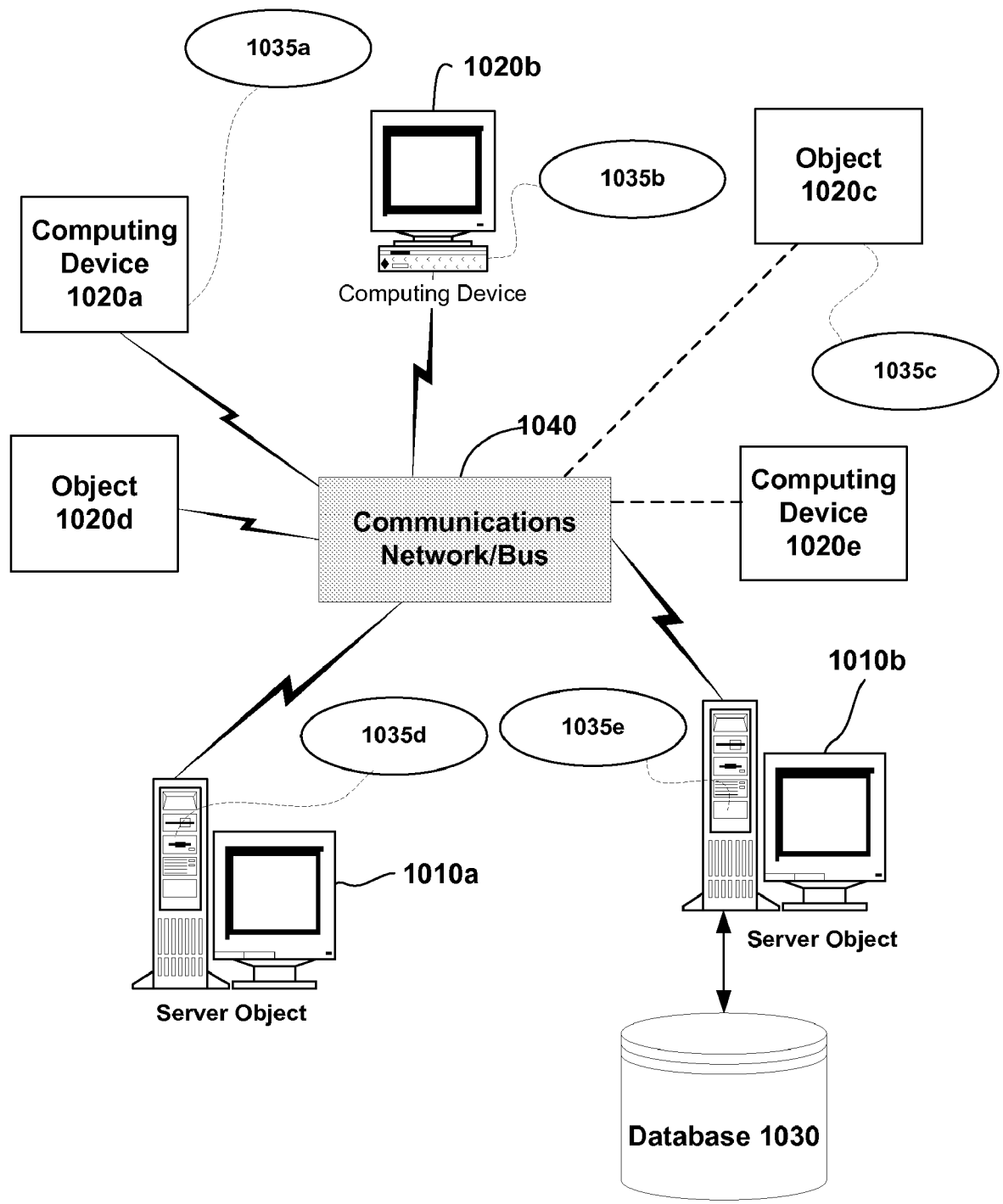
FIG. 10 is a block diagram representing an exemplary non-limiting networked environment in which the present invention may be implemented.

FIG. 10 provides a schematic diagram of an exemplary networked or distributed computing environment. The distributed computing environment comprises computing objects 1010a, 1010b, etc. and computing objects or devices 1020a, 1020b, 1020c, 1020d, 1020e, etc. These objects may comprise programs, methods, data stores, programmable logic, etc. The objects may comprise portions of the same or different devices such as PDAs, audio/video devices, MP3 players, personal computers, etc. Each object can communicate with another object by way of the communications network 1040. This network may itself comprise other computing objects and computing devices that provide services to the system of FIG. 10, and may itself represent multiple interconnected networks. In accordance with an aspect of the invention, each object 1010a, 1010b, etc. or 1020a, 1020b, 1020c, 1020d, 1020e, etc. may contain an application that might make use of an API, or other object, software, firmware and/or hardware, suitable for use with the systems and methods for processing parameterized queries in accordance with the invention.

It can also be appreciated that an object, such as 1020c, may be hosted on another computing device 1010a, 1010b, etc. or 1020a, 1020b, 1020c, 1020d, 1020e, etc. Thus, although the physical environment depicted may show the connected devices as computers, such illustration is merely exemplary and the physical environment may alternatively be depicted or described comprising various digital devices such as PDAs, televisions, MP3 players, etc., any of which may employ a variety of wired and wireless services, software objects such as interfaces, COM objects, and the like.

There are a variety of systems, components, and network configurations that support distributed computing environments. For example, computing systems may be connected together by wired or wireless systems, by local networks or widely distributed networks. Currently, many of the networks are coupled to the Internet, which provides an infrastructure for widely distributed computing and encompasses many different networks. Any of the infrastructures may be used for exemplary communications made incident to processing parameterized queries according to the present invention.

In home networking environments, there are at least four disparate network transport media that may each support a unique protocol, such as Power line, data (both wireless and wired), voice (e.g., telephone) and entertainment media. Most home control devices such as light switches and appliances may use power lines for connectivity. Data Services may enter the home as broadband (e.g., either DSL or Cable modem) and are accessible within the home using either wireless (e.g., HomeRF or 802.11B) or wired (e.g., Home PNA, Cat 5, Ethernet, even power line) connectivity. Voice traffic may enter the home either as wired (e.g., Cat 3) or wireless (e.g., cell phones) and may be distributed within the home using Cat 3 wiring. Entertainment media, or other graphical data, may enter the home either through satellite or cable and is typically distributed in the home using coaxial cable. IEEE 1394 and DVI are also digital interconnects for clusters of media devices. All of these network environments and others that may emerge, or already have emerged, as protocol standards may be interconnected to form a network, such as an intranet, that may be connected to the outside world by way of a wide area network, such as the Internet. In short, a variety of disparate sources exist for the storage and transmission of data, and consequently, any of the computing devices of the present invention may share and communicate data in any existing manner, and no one way described in the embodiments herein is intended to be limiting.

The Internet commonly refers to the collection of networks and gateways that utilize the Transmission Control Protocol/Internet Protocol (TCP/IP) suite of protocols, which are well-known in the art of computer networking. The Internet can be described as a system of geographically distributed remote computer networks interconnected by computers executing networking protocols that allow users to interact and share information over network(s). Because of such wide-spread information sharing, remote networks such as the Internet have thus far generally evolved into an open system with which developers can design software applications for performing specialized operations or services, essentially without restriction.

Thus, the network infrastructure enables a host of network topologies such as client/server, peer-to-peer, or hybrid architectures. The "client" is a member of a class or group that uses the services of another class or group to which it is not related. Thus, in computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the illustration of FIG. 10, as an example, computers 1020a, 1020b, 1020c, 1020d, 1020e, etc. can be thought of as clients and computers 1010a, 1010b, etc. can be thought of as servers where servers 1010a, 1010b, etc. maintain the data that is then replicated to client computers 1020a, 1020b, 1020c, 1020d, 1020e, etc., although any computer can be considered a client, a server, or both, depending on the circumstances. Any of these computing devices may be processing data or requesting services or tasks that may implicate the processing of parameterized queries in accordance with the invention.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques for processing parameterized queries of the invention may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

Thus, FIG. 10 illustrates an exemplary networked or distributed environment, with server(s) in communication with client computer (s) via a network/bus, in which the present invention may be employed. In more detail, a number of servers 1010a, 1010b, etc. are interconnected via a communications network/bus 1040, which may be a LAN, WAN, intranet, GSM network, the Internet, etc., with a number of client or remote computing devices 1020a, 1020b, 1020c, 1020d, 1020e, etc., such as a portable computer, handheld computer, thin client, networked appliance, or other device, such as a VCR, TV, oven, light, heater and the like in accordance with the present invention. It is thus contemplated that the present invention may apply to any computing device in connection with which it is desirable to process parameterized queries more efficiently.

In a network environment in which the communications network/bus 1040 is the Internet, for example, the servers 1010a, 1010b, etc. can be Web servers with which the clients 1020a, 1020b, 1020c, 1020d, 1020e, etc. communicate via any of a number of known protocols such as HTTP. Servers 1010a, 1010b, etc. may also serve as clients 1020a, 1020b, 1020c, 1020d, 1020e, etc., as may be characteristic of a distributed computing environment.

As mentioned, communications may be wired or wireless, or a combination, where appropriate. Client devices 1020a, 1020b, 1020c, 1020d, 1020e, etc. may or may not communicate via communications network/bus 14, and may have independent communications associated therewith. For example, in the case of a TV or VCR, there may or may not be a networked aspect to the control thereof. Each client computer 1020a, 1020b, 1020c, 1020d, 1020e, etc. and server computer 1010a, 1100b, etc. may be equipped with various application program modules or objects 135a, 135b, 135c, etc. and with connections or access to various types of storage elements or objects, across which files or data streams may be stored or to which portion(s) of files or data streams may be downloaded, transmitted or migrated. Any one or more of computers 1010a, 1010b, 1020a, 1020b, 1020c, 1020d, 1020e, etc. may be responsible for the maintenance and updating of a database 1030 or other storage element, such as a database or memory 1030 for storing data processed or saved according to the invention. Thus, the present invention can be utilized in a computer network environment having client computers 1020a, 1020b, 1020c, 1020d, 1020e, etc. that can access and interact with a computer network/bus 1040 and server computers 1010a, 1010b, etc. that may interact with client computers 1020a, 1020b, 1020c, 1020d, 1020e, etc. and other like devices, and databases 1030.

Exemplary Computing Device

Figure 11:
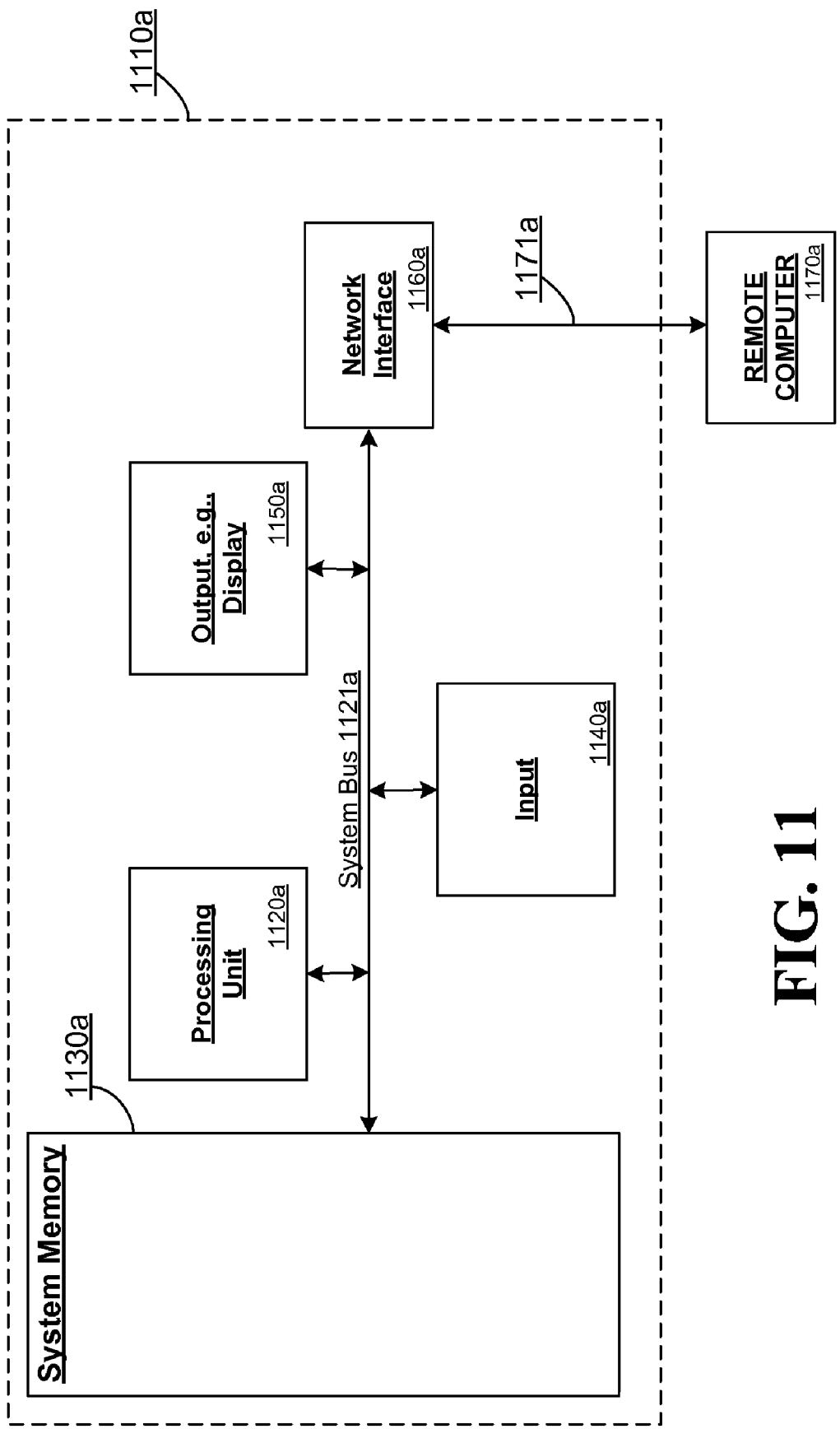
FIG. 11 is a block diagram representing an exemplary non-limiting computing system or operating environment in which the present invention may be implemented.

As mentioned, the invention applies to any device wherein it may be desirable to process parameterized queries more efficiently. It should be understood, therefore, that handheld, portable and other computing devices and computing objects of all kinds are contemplated for use in connection with the present invention, i.e., anywhere that a device may receive or submit a parameterized query, or otherwise receive, process or store data. Accordingly, the below general purpose remote computer described below in FIG. 11 is but one example, and the present invention may be implemented with any client having network/bus interoperability and interaction. Thus, the present invention may be implemented in an environment of networked hosted services in which very little or minimal client resources are implicated, e.g., a networked environment in which the client device serves merely as an interface to the network/bus, such as an object placed in an appliance.

Although not required, the invention can partly be implemented via an operating system, for use by a developer of services for a device or object, and/or included within application software that operates in connection with the component(s) of the invention. Software may be described in the general context of computer-executable instructions, such as program modules, being executed by one or more computers, such as client workstations, servers or other devices. Those skilled in the art will appreciate that the invention may be practiced with other computer system configurations and protocols.

FIG. 11 thus illustrates an example of a suitable computing system environment 1100a in which the invention may be implemented, although as made clear above, the computing system environment 1100a is only one example of a suitable computing environment for a media device and is not intended to suggest any limitation as to the scope of use or functionality of the invention. Neither should the computing environment 1100a be interpreted as having any dependency or requirement relating to any one or combination of components illustrated in the exemplary operating environment 1100a.

With reference to FIG. 11, an exemplary remote device for implementing the invention includes a general purpose computing device in the form of a computer 1110a. Components of computer 1110a may include, but are not limited to, a processing unit 1120a, a system memory 1130a, and a system bus 1121a that couples various system components including the system memory to the processing unit 1120a. The system bus 1121a may be any of several types of bus structures including a memory bus or memory controller, a peripheral bus, and a local bus using any of a variety of bus architectures.

Computer 1110a typically includes a variety of computer readable media. Computer readable media can be any available media that can be accessed by computer 1110a. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other storage medium which can be used to store the desired information and which can be accessed by computer 1110a. Communication media typically embodies computer readable instructions, data structures, program modules or other data in a modulated data signal such as a carrier wave or other transport mechanism and includes any information delivery media.

The system memory 1130a may include computer storage media in the form of volatile and/or nonvolatile memory such as read only memory (ROM) and/or random access memory (RAM). A basic input/output system (BIOS), containing the basic routines that help to transfer information between elements within computer 1110a, such as during start-up, may be stored in memory 1130a. Memory 1130a typically also contains data and/or program modules that are immediately accessible to and/or presently being operated on by processing unit 1120a. By way of example, and not limitation, memory 1130a may also include an operating system, application programs, other program modules, and program data.

The computer 1110a may also include other removable/non-removable, volatile/nonvolatile computer storage media. For example, computer 1110a could include a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. A hard disk drive is typically connected to the system bus 1121a through a non-removable memory interface such as an interface, and a magnetic disk drive or optical disk drive is typically connected to the system bus 1121a by a removable memory interface, such as an interface.

A user may enter commands and information into the computer 1110a through input devices such as a keyboard and pointing device, commonly referred to as a mouse, trackball or touch pad. Other input devices may include a microphone, joystick, game pad, satellite dish, scanner, or the like. These and other input devices are often connected to the processing unit 1120a through user input 1140a and associated interface(s) that are coupled to the system bus 1121a, but may be connected by other interface and bus structures, such as a parallel port, game port or a universal serial bus (USB). A graphics subsystem may also be connected to the system bus 1121a. A monitor or other type of display device is also connected to the system bus 1121a via an interface, such as output interface 1150a, which may in turn communicate with video memory. In addition to a monitor, computers may also include other peripheral output devices such as speakers and a printer, which may be connected through output interface 1150a.

The computer 1110a may operate in a networked or distributed environment using logical connections to one or more other remote computers, such as remote computer 1170a, which may in turn have media capabilities different from device 1110a. The remote computer 1170a may be a personal computer, a server, a router, a network PC, a peer device or other common network node, or any other remote media consumption or transmission device, and may include any or all of the elements described above relative to the computer 1110a. The logical connections depicted in FIG. 11 include a network 1171a, such local area network (LAN) or a wide area network (WAN), but may also include other networks/buses. Such networking environments are commonplace in homes, offices, enterprise-wide computer networks, intranets and the Internet.

When used in a LAN networking environment, the computer 1110a is connected to the LAN 1171a through a network interface or adapter. When used in a WAN networking environment, the computer 1110a typically includes a communications component, such as a modem, or other means for establishing communications over the WAN, such as the Internet. A communications component, such as a modem, which may be internal or external, may be connected to the system bus 1121a via the user input interface of input 1140a, or other appropriate mechanism. In a networked environment, program modules depicted relative to the computer 1110a, or portions thereof, may be stored in a remote memory storage device. It will be appreciated that the network connections shown and described are exemplary and other means of establishing a communications link between the computers may be used.

Exemplary Distributed Computing Architectures

Various distributed computing frameworks have been and are being developed in light of the convergence of personal computing and the Internet. Individuals and business users alike are provided with a seamlessly interoperable and Web-enabled interface for applications and computing devices, making computing activities increasingly Web browser or network-oriented.

For example, MICROSOFT®'s managed code platform, i.e., .NET, includes servers, building-block services, such as Web-based data storage and downloadable device software. Generally speaking, the .NET platform provides (1) the ability to make the entire range of computing devices work together and to have user information automatically updated and synchronized on all of them, (2) increased interactive capability for Web pages, enabled by greater use of XML rather than HTML, (3) online services that feature customized access and delivery of products and services to the user from a central starting point for the management of various applications, such as e-mail, for example, or software, such as Office .NET, (4) centralized data storage, which increases efficiency and ease of access to information, as well as synchronization of information among users and devices, (5) the ability to integrate various communications media, such as e-mail, faxes, and telephones, (6) for developers, the ability to create reusable modules, thereby increasing productivity and reducing the number of programming errors and (7) many other cross-platform and language integration features as well.

While some exemplary embodiments herein are described in connection with software, such as an application programming interface (API), residing on a computing device, one or more portions of the invention may also be implemented via an operating system, or a "middle man" object, a control object, hardware, firmware, intermediate language instructions or objects, etc., such that the methods for processing parameterized queries in accordance with the invention may be included in, supported in or accessed via all of the languages and services enabled by managed code, such as .NET code, and in other distributed computing frameworks as well.

Exemplary Interface Implementations

For any exchange of data among multiple computers, there are interfaces for handling the various operations on each computer that can be implemented in hardware and/or software and which operate to receive, send and/or process the data in some fashion, according to the relevant applications and services being requested or provided. An example of a set of software interfaces described herein includes client side drivers and associated interfaces for submitting a parameterized query from client drivers to a database server so that the parameterized query is processed according to the server side solution of the invention. This may include receiving a parameterized query at one or more server side interfaces from the client side drivers and interfaces. Accordingly, to the extent that one or more interface objects may be provided to achieve or implement any portion of the systems and methods for processing parameterized queries in accordance with the invention, the invention is intended to encompass all such embodiments, and thus a general description of the kinds of interfaces that might be provided or utilized when implementing or carrying out the invention follows.

A programming interface (or more simply, interface) may be viewed as any mechanism, process, protocol for enabling one or more segment(s) of code to communicate with or access the functionality provided by one or more other segment(s) of code. Alternatively, a programming interface may be viewed as one or more mechanism(s), method(s), function call(s), module(s), object(s), etc. of a component of a system capable of communicative coupling to one or more mechanism(s), method(s), function call(s), module(s), etc. of other component(s). The term "segment of code" in the preceding sentence is intended to include one or more instructions or lines of code, and includes, e.g., code modules, objects, subroutines, functions, and so on, regardless of the terminology applied or whether the code segments are separately compiled, or whether the code segments are provided as source, intermediate, or object code, whether the code segments are utilized in a runtime system or process, or whether they are located on the same or different machines or distributed across multiple machines, or whether the functionality represented by the segments of code are implemented wholly in software, wholly in hardware, or a combination of hardware and software.

Figure 12A:
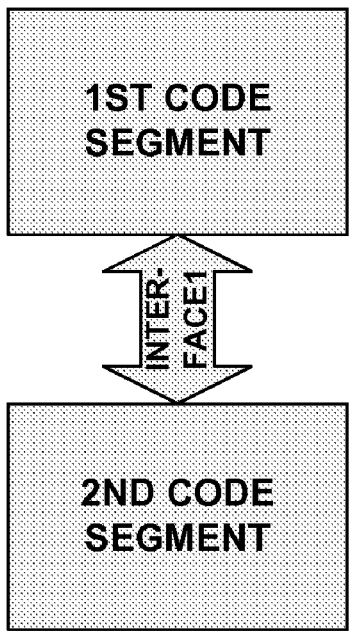
Figure 12B:
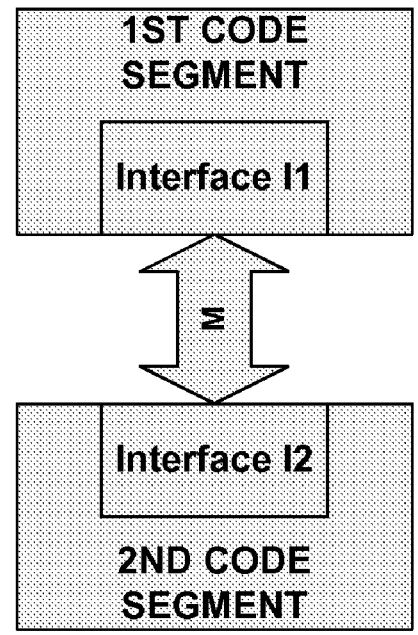

Notionally, a programming interface may be viewed generically, as shown in FIG. 12A or FIG. 12B. FIG. 12A illustrates an interface Interface1 as a conduit through which first and second code segments communicate. FIG. 12B illustrates an interface as comprising interface objects I1 and I2 (which may or may not be part of the first and second code segments), which enable first and second code segments of a system to communicate via medium M. In the view of FIG. 12B, one may consider interface objects I1 and I2 as separate interfaces of the same system and one may also consider that objects I1 and I2 plus medium M comprise the interface. Although FIGS. 12A and 12B show bidirectional flow and interfaces on each side of the flow, certain implementations may only have information flow in one direction (or no information flow as described below) or may only have an interface object on one side. By way of example, and not limitation, terms such as application programming interface (API), entry point, method, function, subroutine, remote procedure call, and component object model (COM) interface, are encompassed within the definition of programming interface.

Aspects of such a programming interface may include the method whereby the first code segment transmits information (where "information" is used in its broadest sense and includes data, commands, requests, etc.) to the second code segment; the method whereby the second code segment receives the information; and the structure, sequence, syntax, organization, schema, timing and content of the information. In this regard, the underlying transport medium itself may be unimportant to the operation of the interface, whether the medium be wired or wireless, or a combination of both, as long as the information is transported in the manner defined by the interface. In certain situations, information may not be passed in one or both directions in the conventional sense, as the information transfer may be either via another mechanism (e.g. information placed in a buffer, file, etc. separate from information flow between the code segments) or non-existent, as when one code segment simply accesses functionality performed by a second code segment. Any or all of these aspects may be important in a given situation, e.g., depending on whether the code segments are part of a system in a loosely coupled or tightly coupled configuration, and so this list should be considered illustrative and non-limiting.

This notion of a programming interface is known to those skilled in the art and is clear from the foregoing detailed description of the invention. There are, however, other ways to implement a programming interface, and, unless expressly excluded, these too are intended to be encompassed by the claims set forth at the end of this specification. Such other ways may appear to be more sophisticated or complex than the simplistic view of FIGS. 12A and 12B, but they nonetheless perform a similar function to accomplish the same overall result. We will now briefly describe some illustrative alternative implementations of a programming interface.

A. Factoring

Figure 13A:
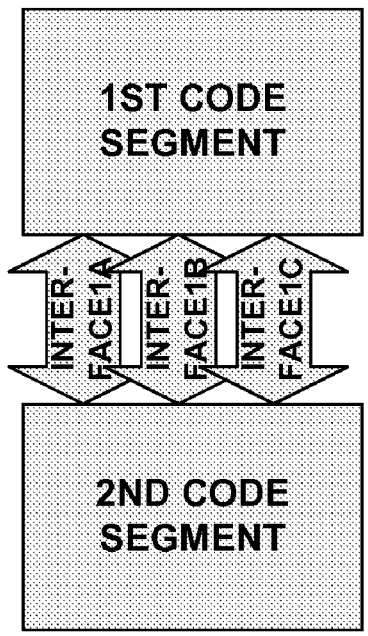
Figure 13B:
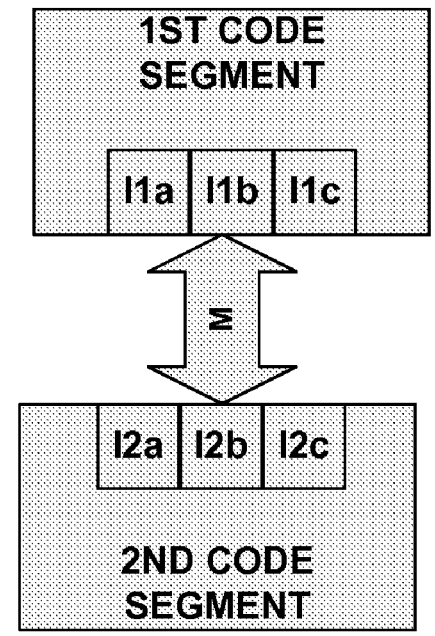

A communication from one code segment to another may be accomplished indirectly by breaking the communication into multiple discrete communications. This is depicted schematically in FIGS. 13A and 13B. As shown, some interfaces can be described in terms of divisible sets of functionality. Thus, the interface functionality of FIGS. 12A and 12B may be factored to achieve the same result, just as one may mathematically provide 24, or 2 times 2 times 3 times 2. Accordingly, as illustrated in FIG. 13A, the function provided by interface Interface1 may be subdivided to convert the communications of the interface into multiple interfaces Interface 1A, Interface 1B, Interface 1C, etc. while achieving the same result. As illustrated in FIG. 13B, the function provided by interface I1 may be subdivided into multiple interfaces I1a, I1b, I1c, etc. while achieving the same result. Similarly, interface I2 of the second code segment which receives information from the first code segment may be factored into multiple interfaces I2a, I2b, I2c, etc. When factoring, the number of interfaces included with the 1st code segment need not match the number of interfaces included with the 2nd code segment. In either of the cases of FIGS. 13A and 13B, the functional spirit of interfaces Interface1 and I1 remain the same as with FIGS. 12A and 12B, respectively. The factoring of interfaces may also follow associative, commutative, and other mathematical properties such that the factoring may be difficult to recognize. For instance, ordering of operations may be unimportant, and consequently, a function carried out by an interface may be carried out well in advance of reaching the interface, by another piece of code or interface, or performed by a separate component of the system. Moreover, one of ordinary skill in the programming arts can appreciate that there are a variety of ways of making different function calls that achieve the same result.

B. Redefinition

In some cases, it may be possible to ignore, add or redefine certain aspects (e.g., parameters) of a programming interface while still accomplishing the intended result. This is illustrated in FIGS. 14A and 14B. For example, assume interface Interface1 of FIG. 12A includes a function call Square (input, precision, output), a call that includes three parameters, input, precision and output, and which is issued from the 1 st Code Segment to the 2nd Code Segment. If the middle parameter precision is of no concern in a given scenario, as shown in FIG. 14A, it could just as well be ignored or even replaced with a meaningless (in this situation) parameter. One may also add an additional parameter of no concern. In either event, the functionality of square can be achieved, so long as output is returned after input is squared by the second code segment. Precision may very well be a meaningful parameter to some downstream or other portion of the computing system; however, once it is recognized that precision is not necessary for the narrow purpose of calculating the square, it may be replaced or ignored. For example, instead of passing a valid precision value, a meaningless value such as a birth date could be passed without adversely affecting the result. Similarly, as shown in FIG. 14B, interface I1 is replaced by interface I1', redefined to ignore or add parameters to the interface. Interface I2 may similarly be redefined as interface I2', redefined to ignore unnecessary parameters, or parameters that may be processed elsewhere. The point here is that in some cases a programming interface may include aspects, such as parameters, that are not needed for some purpose, and so they may be ignored or redefined, or processed elsewhere for other purposes.

C. Inline Coding

It may also be feasible to merge some or all of the functionality of two separate code modules such that the "interface" between them changes form. For example, the functionality of FIGS. 12A and 12B may be converted to the functionality of FIGS. 15A and 15B, respectively. In FIG. 15A, the previous 1 st and 2nd Code Segments of FIG. 12A are merged into a module containing both of them. In this case, the code segments may still be communicating with each other but the interface may be adapted to a form which is more suitable to the single module. Thus, for example, formal Call and Return statements may no longer be necessary, but similar processing or response(s) pursuant to interface Interface1 may still be in effect. Similarly, shown in FIG. 15B, part (or all) of interface I2 from FIG. 12B may be written inline into interface I1 to form interface I1". As illustrated, interface I2 is divided into I2a and I2b, and interface portion I2a has been coded in-line with interface I1 to form interface I1". For a concrete example, consider that the interface I1 from FIG. 12B performs a function call square (input, output), which is received by interface I2, which after processing the value passed with input (to square it) by the second code segment, passes back the squared result with output. In such a case, the processing performed by the second code segment (squaring input) can be performed by the first code segment without a call to the interface.

D. Divorce

A communication from one code segment to another may be accomplished indirectly by breaking the communication into multiple discrete communications. This is depicted schematically in FIGS. 16A and 16B. As shown in FIG. 16A, one or more piece(s) of middleware (Divorce Interface(s), since they divorce functionality and/or interface functions from the original interface) are provided to convert the communications on the first interface, Interface1, to conform them to a different interface, in this case interfaces Interface2A, Interface2B and Interface2C. This might be done, e.g., where there is an installed base of applications designed to communicate with, say, an operating system in accordance with an Interface1 protocol, but then the operating system is changed to use a different interface, in this case interfaces Interface2A, Interface2B and Interface2C. The point is that the original interface used by the 2nd Code Segment is changed such that it is no longer compatible with the interface used by the 1st Code Segment, and so an intermediary is used to make the old and new interfaces compatible. Similarly, as shown in FIG. 16B, a third code segment can be introduced with divorce interface DI1 to receive the communications from interface I1 and with divorce interface DI2 to transmit the interface functionality to, for example, interfaces I2a and I2b, redesigned to work with DI2, but to provide the same functional result. Similarly, DI1 and DI2 may work together to translate the functionality of interfaces I1 and I2 of FIG. 12B to a new operating system, while providing the same or similar functional result.

E. Rewriting

Figure 17A:
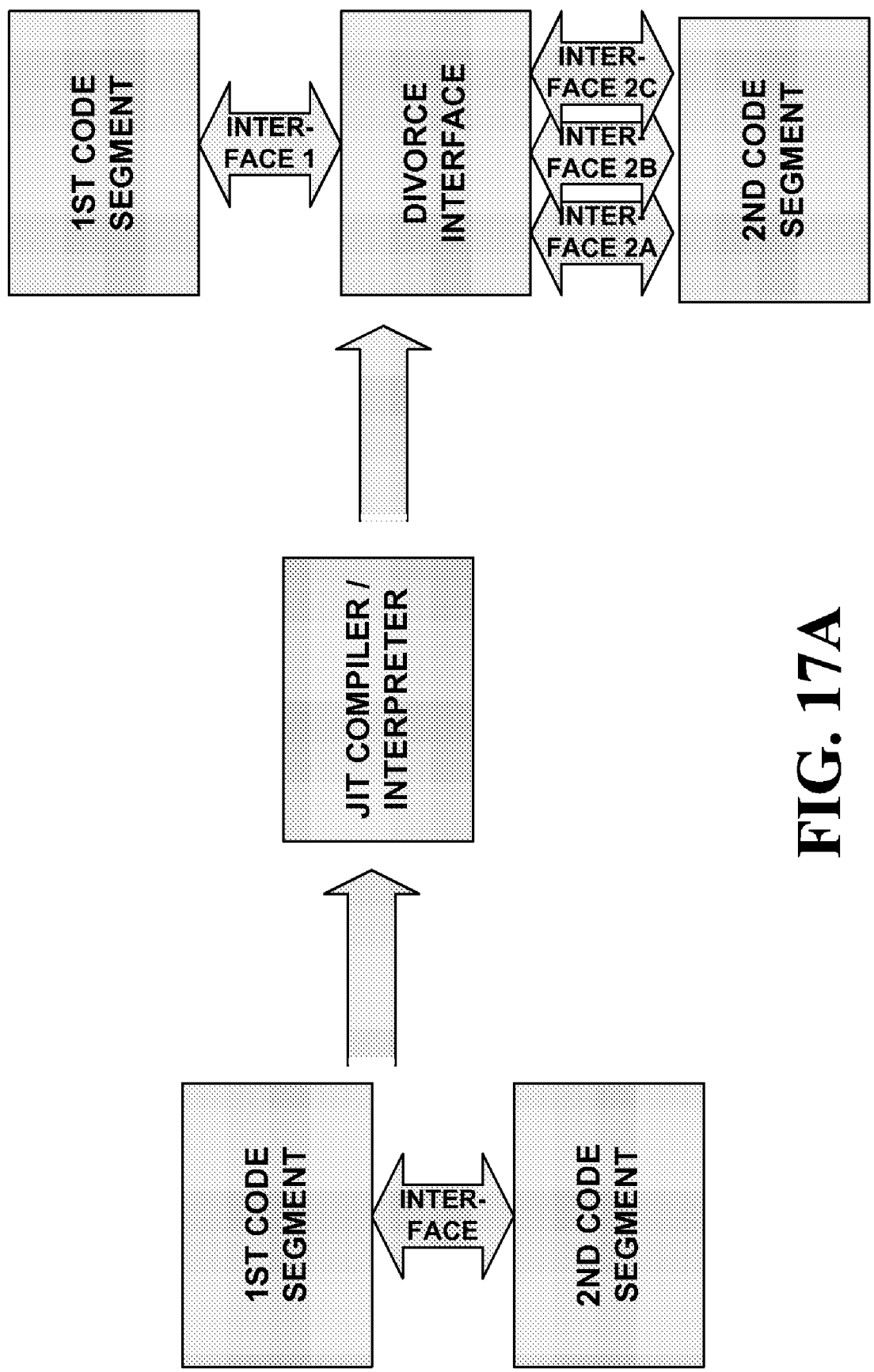
Figure 17B:
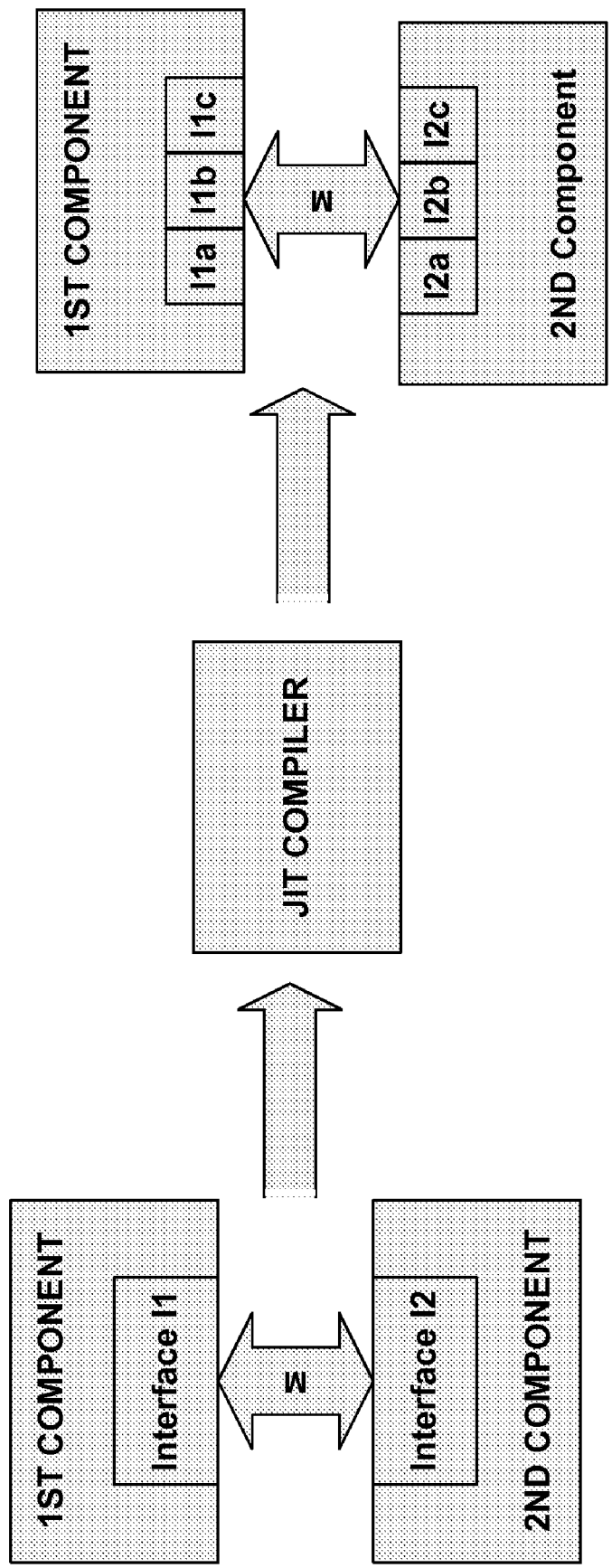

Yet another possible variant is to dynamically rewrite the code to replace the interface functionality with something else but which achieves the same overall result. For example, there may be a system in which a code segment presented in an intermediate language (e.g. Microsoft IL, Java ByteCode, etc.) is provided to a Just-in-Time (JIT) compiler or interpreter in an execution environment (such as that provided by the .Net framework, the Java runtime environment, or other similar runtime type environments). The JIT compiler may be written so as to dynamically convert the communications from the 1st Code Segment to the 2nd Code Segment, i.e., to conform them to a different interface as may be required by the 2nd Code Segment (either the original or a different 2nd Code Segment). This is depicted in FIGS. 17A and 17B. As can be seen in FIG. 17A, this approach is similar to the Divorce scenario described above. It might be done, e.g., where an installed base of applications are designed to communicate with an operating system in accordance with an Interface 1 protocol, but then the operating system is changed to use a different interface. The JIT Compiler could be used to conform the communications on the fly from the installed-base applications to the new interface of the operating system. As depicted in FIG. 17B, this approach of dynamically rewriting the interface(s) may be applied to dynamically factor, or otherwise alter the interface(s) as well.

It is also noted that the above-described scenarios for achieving the same or similar result as an interface via alternative embodiments may also be combined in various ways, serially and/or in parallel, or with other intervening code. Thus, the alternative embodiments presented above are not mutually exclusive and may be mixed, matched and combined to produce the same or equivalent scenarios to the generic scenarios presented in FIGS. 12A and 12B. It is also noted that, as with most programming constructs, there are other similar ways of achieving the same or similar functionality of an interface which may not be described herein, but nonetheless are represented by the spirit and scope of the invention, i.e., it is noted that it is at least partly the functionality represented by, and the advantageous results enabled by, an interface that underlie the value of an interface.

There are multiple ways of implementing the present invention, e.g., an appropriate API, tool kit, driver code, operating system, control, standalone or downloadable software object, etc. which enables applications and services to use the systems and methods for transforming or bucketizing parameterized queries of the invention. The invention contemplates the use of the invention from the standpoint of an API (or other software object), as well as from a software or hardware object that receives a downloaded program in accordance with the invention. Thus, various implementations of the invention described herein may have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

As mentioned above, while exemplary embodiments of the present invention have been described in connection with various computing devices and network architectures, the underlying concepts may be applied to any computing device or system in which it is desirable to perform more efficient querying. For instance, the software of the invention may be applied to the operating system of a computing device, provided as a separate object on the device, as part of another object, as a reusable control, as a downloadable object from a server, as a "middle man" between a device or object and the network, as a distributed object, as hardware, in memory, a combination of any of the foregoing, etc. While exemplary programming languages, names and examples are chosen herein as representative of various choices, these languages, names and examples are not intended to be limiting. One of ordinary skill in the art will appreciate that there are numerous ways of providing object code and nomenclature that achieves the same, similar or equivalent functionality achieved by the various embodiments of the invention.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. One or more programs that may implement or utilize the server side techniques for bucketizing parameterized queries of the present invention, e.g., through the use of a data processing API, reusable controls, or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, etc., the machine becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The term "article of manufacture" (or alternatively, "computer program product") where used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally, it is known that a carrier wave can be employed to carry computer-readable electronic data such as those used in transmitting and receiving electronic mail or in accessing a network such as the Internet or a local area network (LAN).

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described supra, methodologies that may be implemented in accordance with the disclosed subject matter will be better appreciated with reference to the flowcharts of FIGS. 5 and 8. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

Furthermore, as will be appreciated various portions of the disclosed systems above and methods below may include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent.

While the present invention has been described in connection with the preferred embodiments of the various figures, it is to be understood that other similar embodiments may be used or modifications and additions may be made to the described embodiment for performing the same function of the present invention without deviating therefrom. For example, while exemplary network environments of the invention are described in the context of a networked environment, such as a peer to peer networked environment, one skilled in the art will recognize that the present invention is not limited thereto, and that the methods, as described in the present application may apply to any computing device or environment, such as a gaming console, handheld computer, portable computer, etc., whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate.

While exemplary embodiments refer to utilizing the present invention in the context of particular programming language constructs, the invention is not so limited, but rather may be implemented in any query language to provide the methods for transforming parameterized queries for more efficient sharing of query execution plans. Still further, the present invention may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed is:

1. A computer-implemented method, comprising:
   receiving, from a requesting object, at least one parameterized query expression of a structured query language (SQL);
   generating at least one new parameterized query expression based on the at least one received parameterized query expression, wherein the generating includes replacing a type of at least one parameter of the at least one parameterized query expression with a new normalized parameter type, wherein the replacing is executed, according to at least one pre-defined conversion algorithm, the at least one parameter being associated with first metadata to be returned by a query;
   determining for the at least one parameter, whether said replacing the type of the at least one parameter will:
      change semantic information of the at least one parameterized query expression; and
      cause second metadata to be returned by the query, wherein the first metadata to be returned by the query is different from the second metadata to be returned by the query;
   performing said replacing the type of the at least one parameter based, at least, on the determining for the at least one parameter that:
      said semantic information of the at least one parameterized query expression will remain unchanged; and
      the first metadata to be returned by the query is the same as the second metadata to be returned by the query; and
   identifying whether literals of a non-parameterized query statement are parameterizable to a parameterized query expression by:
      determining whether replacing the literals with a parameter will not change data or metadata transmitted back to a client; and
      identifying as literals that are parameterizable to the parameterized query expression, ones of the literals for which the replacing will not change data or metadata transmitted back to the client;
   wherein the type of the at least one parameter has a length in a range from 1 to n and the new normalized parameter type has a length equal to n, wherein said n is at least one of an integer or a real number.

2. The computer-implemented method according to claim 1, wherein, for at least one of variable length non-Unicode character data (varchar), length Unicode character data (nvarchar) or variable length binary data (varbinary) types.

3. The computer-implemented method according to claim 1, wherein said new normalized parameter type is broader than said type of the at least one parameter.

4. The computer-implemented method according to claim 1, wherein said new normalized parameter type is more specialized than said type of the at least one parameter.

5. A database server-side system configured to maintain and update a data store, the database server-side system comprising:
   a processor; and
   a computer-readable storage medium storing instructions that, when executed by the processor, cause the processor to implement at least one of a parameter type bucketization logic component or a query optimizer component, said instructions executable for:

the parameter type bucketization logic component configured to receive at least one parameterized query expression of a structured query language (SQL) and generate at least one new parameterized query expression based on the at least one parameterized query expression, wherein the at least one parameterized expression includes a parameter type associated with first metadata to be returned by a query, and wherein a generated at least one new parameterized query expression includes a parameter type associated with a second metadata to be returned by the query, wherein the parameter type bucketization logic component includes an extension to a server-side parameterization framework of the structured query language (SQL) server and is configured to:
  determine whether, based on the at least one new parameterized query expression:
    semantic information of the at least one parameterized query expression will change; and
    the second metadata to be returned by the query will be different from the first metadata to be returned by the query; and
  generate the at least one new parameterized query expression based, at least, on a determination that the semantic information will not change and the second metadata will be the same as the first metadata;
a query optimizer component configured to receive the at least one new parameterized query expression and generate an optimized query plan according to the at least one new parameterized query expression,
  wherein the extension is configured to employ a mechanism of the server-side parameterization framework, wherein the mechanism is configured to identify whether literals of a non-parameterized query statement are parameterizable to a parameterized query expression by:
    determining whether replacing the literals with a parameter will not change data or metadata transmitted back to a client; and
    identifying as literals that are parameterizable to the parameterized query expression, ones of the literals for which the replacing will not change data or metadata transmitted back to the client,
  wherein said parameter type bucketization logic component is configured to convert the parameter type having a length between 1 and n to a new type having a length equal to n, wherein said n is at least one of an integer or a real number.

6. The database server-side system of claim 5, wherein the parameter type bucketization logic component is configured to transform a plurality of parameterized query expressions, to a new parameterized query expression that is common to each of the plurality of parameterized query expressions, wherein the plurality of parameterized query expressions are those for which the optimizer component is configured to generate separate query plans.

7. The database server-side system of claim 6, wherein an execution plan generated by the query optimizer component for the new parameterized query expression is configured to be cached and shared with each of the plurality of parameterized query expressions.

8. The database server-side system of claim 5, wherein said type of the at least one parameter is at least one of a fixed length character (char) type, a variable length non-Unicode character data (varchar) type or a variable length binary data (varbinary) type.

9. The database server-side system of claim 5, wherein the parameter type bucketization logic component is further configured to rename a type for the at least one parameter according to a naming convention, wherein the bucketization logic component is configured to rename the type for the at least one parameter based, at least, on a value passed for the at least one parameter.

10. An application programming interface embodied on a computer-readable storage medium and configured to interface with the database server-side system of claim 5, and facilitate performing functions for which the parameter type bucketization logic component of the database server-side system is configured.

11. A computer-implemented method comprising:
  receiving, by a database server-side object, a first parameterized query expression of a structured query language (SQL), wherein the first parameterized query expression includes at least one literal including a first parameter type;
  transforming the first parameterized query expression to a first bucketized query expression according to a transformation process that changes the first parameter type to a new normalized parameter type, wherein the first parameter type is associated with first metadata to be returned by a query, and wherein the new normalized parameter type is associated with second metadata to be returned by the query, and wherein the transforming is performed based, at least, on determining that the second metadata would be the same as the first metadata;
  generating a query execution plan based on the first bucketized query expression;
  receiving, by the database server-side object, a second parameterized query expression of the query language, wherein the second parameterized query expression includes at least one literal including a second parameter type, wherein the second parameter type is different than the first parameter type;
  transforming the second parameterized query expression to a second bucketized query expression according to the transformation process, whereby the transformation process changes the second parameter type to said new normalized parameter type, wherein the second parameter type is associated with third metadata to be returned by a query, and wherein the transforming is performed based, at least, on determining that the third metadata would be the same as the first metadata;
  accessing said query execution plan generated based on the first bucketized query expression based, at least, on executing said second bucketized query expression;
  identifying whether literals of a non-parameterized query statement are parameterizable to a parameterized query expression by:
    determining whether replacing the literals with a parameter will not change data or metadata transmitted back to a client; and
    identifying as literals that are parameterizable to the parameterized query expression, ones of the literals for which the replacing will not change data or metadata transmitted back to the client;
  wherein the first parameter type and the second parameter type have a length in a range from 1 to n and the new normalized parameter type has a length equal to n, wherein said n is at least one of an integer or a real number.

12. The computer-implemented method according to claim 1, further comprising:
  generating an optimized query plan according to the at least one new parameterized query expression.

13. The computer-implemented method according to claim 1, further comprising:

transforming a plurality of parameterized query expressions to a new parameterized query expression that is common to each of the plurality of parameterized query expressions, wherein one or more of the plurality of parameterized query expressions would be associated with separate query execution plans if the transforming the plurality of parameterized query expressions to a new parameterized query expression that is common to each of the plurality of parameterized query expressions was not performed.

* * * * *